Oct. 6, 1931.  K. BYERS ET AL  1,826,200
ROTARY WIRE WHISK
Filed March 31, 1930
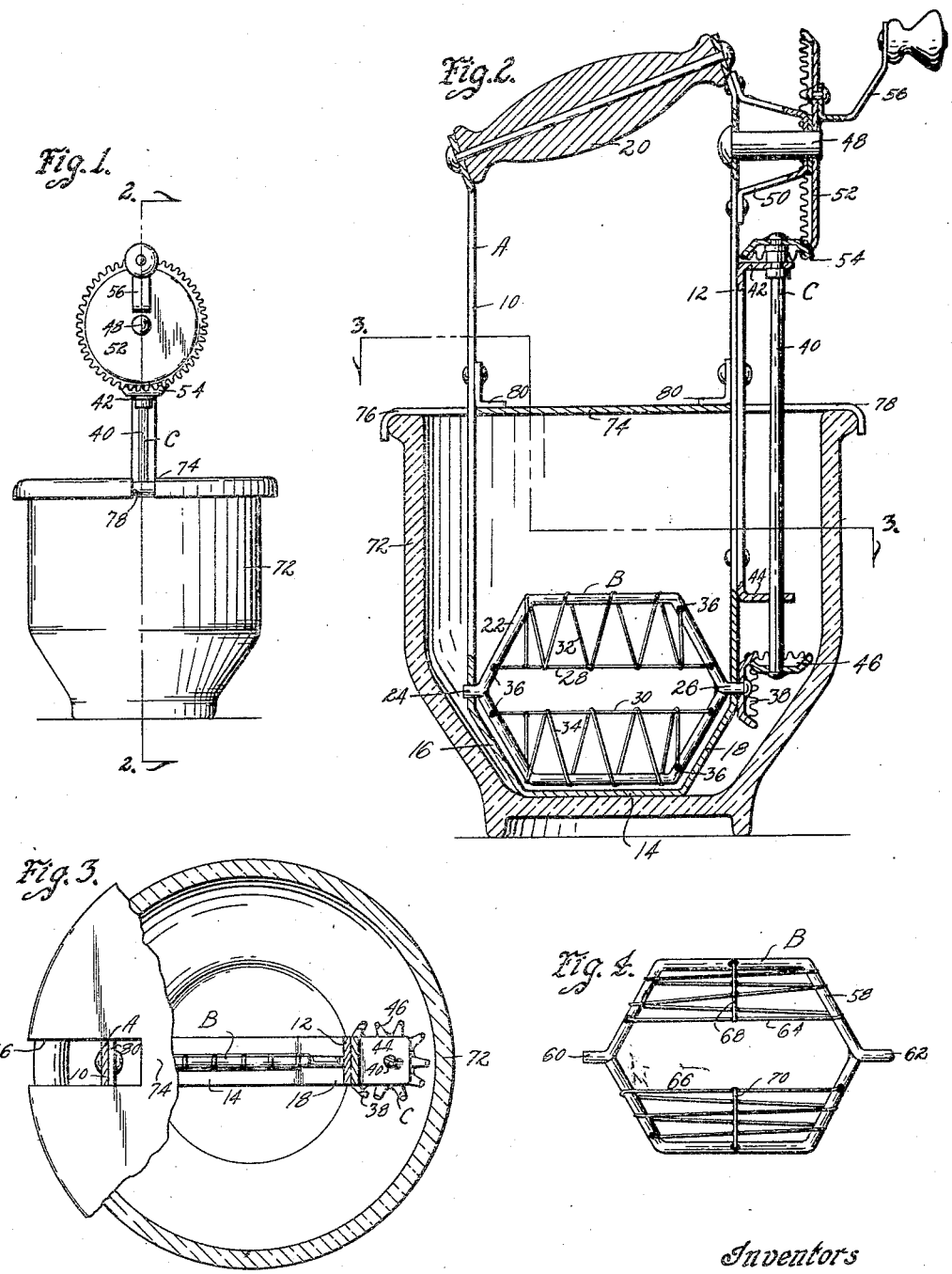
Inventors
~ Katherine Byers & John Hug ~
by Bair, Freeman & Sinclair
Attorneys Patented Oct. 6, 1931

1,826,200

UNITED STATES PATENT OFFICE

KATHERINE BYERS AND JOHN HUG, OF AMES, IOWA

ROTARY WIRE WHISK

Application filed March 31, 1930. Serial No. 440,327.

The object of this invention is to provide an improved construction for a rotary whisk especially designed for beating eggs for culinary purposes.

A further object of the invention is to provide a device of the class set forth having a rotor arranged for rotation on a horizontal axis so that its movement is effective for carrying air into the product being whipped, the rotor being composed of a frame partially covered with coiled wire and being open for a considerable space along the axis of rotation to prevent the accumulation of particles of the product.

Another object of the invention is to provide a rotary whisk which is simple of construction, economical to manufacture, easy to operate and capable of being kept in a clean and sanitary condition.

Another object is to provide a rotary whisk which is especially effective in producing a large volume of whipped substance by the introduction of considerable quantities of air thereto.

Still another object is to provide an improved rotary whisk which is especially effective for operation upon the whites of eggs because it will not tend to curdle the egg and will produce a product of even texture for the proper degree and uniformity of fineness in a very short time and will produce the desirable volume and texture of the substance for use in baking angel food cake.

With these and other objects in view, our invention consists in the construction, arrangement and combination of the various parts of our device, whereby the objects contemplated are attained, as hereinafter more fully set forth, pointed out in our claim, and illustrated in the accompanying drawings, in which:

Figure 1 is a side view illustrating our improved whip in position for use with relation to a covered receptacle.

Figure 2 is an enlarged vertical section of the same.

Figure 3 is a horizontal section on the line 3—3 of Figure 2.

Figure 4 is a side elevation of a modified form of rotor which may be used.

Our improved device consists of three principal parts, namely, a main frame A, a rotor B, and an operating mechanism C.

The frame A is composed of two spaced side bars 10 and 12 integrally connected at their lower ends by a cross bar or connecting member 14. If desired, the frame may also include inclined portions 16 and 18 between the side bars and member 14 as shown in Figure 2. It is to be understood that the lower end of the frame may be of any desired shape, but it should conform substantially with the shape of the bowl with which it is to be used. The upper ends of the side bars 10 and 12 are connected by a suitable handle 20 which may be slightly inclined from the horizontal for convenience in grasping it during operation of the device.

The rotor B is composed of a frame 22 which may be formed of heavy wire or light rods and as here shown is hexagonal in form so that when it is arranged in vertical position its lower sides will occupy positions close to and substantially parallel with the lower part of the main frame. The rotor frame 22 is formed at its ends with pintles or trunnions 24 and 26 which are journaled in the lower portions of the side bars 10 and 12 of the main frame whereby the rotor is mounted for rotation on a horizontal axis.

The frame 22 of the rotor is partially covered by means of fine wire suitably coiled or otherwise disposed to produce a reticulated surface.

As shown in Figure 2, the reticulated surface is composed of wires 28 and 30 arranged longitudinally of the rotor and spaced apart on opposite sides of its axis of rotation. The longitudinal wire 28 is connected to the adjacent side of the rotor frame 22 by a wire 32 which is coiled back and forth around said members and the longitudinal wire 32 is similarly connected to the other side of the rotor by a coiled wire 34. The reticulated wires may be connected to the rotor frame 22 by any suitable means such as soldering at the points 36.

The trunnion 26 of the rotor extends through the frame member 12 and a bevel gear 38 is fixed to its projecting end.

An operating shaft 40 is mounted in a position outside of and substantially parallel with the frame bar 12 and is journaled for rotation in bearings 42 and 44 carried by said frame member. A bevel gear 46 is fixed to the lower end of the shaft 40 and meshes with the gear 38.

A driving shaft 48 is journaled in the upper end of the frame bar 12 and in a U shaped bracket 50 carried thereby. A driving gear 52 of relatively large diameter is fixed on or arranged for rotation relative to the shaft 48 and meshes with a bevel gear 54 fixed to the upper end of the operating shaft 40. The driving gear 52 is provided with a crank handle 56 for manual operation.

The operation of the gear 52, by turning the hand crank 56, will cause the other elements of the operating means C to cooperate to rotate the motor B rapidly on its axis. Inasmuch as this rotation is on a horizontal axis, portions of the rotor are caused to travel through the air and carry air into the substance being whipped. This results in a light fluffy product of considerable volume which is especially desirable for certain kinds of cooking, such as the baking of angel food cake.

It will be noted that the reticulated covering for the rotor does not occupy the central part thereof. In other words, a space of some width is left substantially clear, along and on both sides of the axis of rotation, being all of the space between the longitudinal wires 28 and 30. It will be understood that any member at or very near the center of axis of rotation would necessarily have very little movement during the rotation of the device, and hence would tend to accumulate particles or strings of the product being whipped. By making the center of the rotor substantially clear we have eliminated this tendency and prevented the accumulation of unwhipped particles on the central part of the rotor and have thus obviated a big objection to many well known forms of beaters, whips or whisks.

In Figures 4 there is shown a modified form of rotor which includes a frame 58 similar to the frame 22 and having trunnions 60 and 62. The frame 58 is provided on opposite sides of its center with fine wires 64 and 66 which are arranged substantially horizontal and extended back and forth from one side of the frame to the other in elongated coils. If desired, the coiled wires 64 and 66 may be reinforced by cross wires 68 and 70 respectively. It will be noted that in this construction the same open space is left at the axial center of the rotor.

We have found that in the use of this whisk there is an additional advantage in having the axial center of the motor free and clear. This is found in the fact that when the rotor is operated a constant stream of the product or substance being whipped is caused to pass through the open center, thereby entirely doing away with any dead center so far as the substance is concerned. This has a tendency to prevent splashing because it reduces the centrifugal action induced by the rotary movement of the rotor. That portion of the element which passes through the center is caught by the downwardly turning side of the rotor frame and is again beaten on its upward way, thereby giving a double action and producing quicker results.

This improved whisk may be used in any desired receptacle but we have here shown it in connection with a bowl 72 which is shaped in its lower part to conform substantially to the shape of the rotor and its frame. This arrangement, however, is not essential to the successful operation of the device.

At times it may be desirable to provide a cover for the receptacle to prevent splashing of the substance out of the bowl. A special form of cover such as 74 may be provided having oppositely arranged notches 76 and 78 to accommodate the opposite sides of the frame together with the driving element 40. The side bars 10 and 12 of the main frame may be provided with inwardly extending lugs 80 adapted to bear on the top of the cover 74 to hold it in place.

This rotary whisk is inexpensive to manufacture and is strong and durable and capable of long continued use. It is also easy to operate and has been found to be very efficient in use, particularly for the beating of egg whites. We attribute this to the use of the horizontal rotor with coiled wire covering omitted at and near the axial center of the rotor and we believe this to be one of the most important features of our present invention.

Some changes may be made, as for instance in the shape or the number of blades of the rotor frame, without departing from the real spirit and purpose of our invention, and it is our intention to cover by our claim, any modified forms of structure or use of mechanical equivalents, which may be reasonably included within their scope.

We claim as our invention:—

In a rotary whisk for whipping comparatively light substances such as eggs, a rotor comprising an open frame, trunnions projecting from the ends of the frame, a pair of substantially parallel wires extended lengthwise of said frame on opposite sides of its axial center and spaced materially therefrom and also spaced from the sides of the frame, and other wires arranged between the first mentioned wires and the respective sides of the frame, said pair of wires defining between them a clear open space from end to end of the frame and extending laterally a material distance on each side of the axis of rotation as defined by said trunnions, through which open space material may pass freely during the whipping operation.

Des Moines, Iowa, March 20, 1930.

Mrs. KATHERINE BYERS.
JOHN HUG.